(12) United States Patent
Busjaeger et al.

(10) Patent No.: US 12,468,690 B1
(45) Date of Patent: Nov. 11, 2025

(54) MECHANISMS FOR ACCESSING DATABASE RECORDS LOCALLY

(71) Applicant: Salesforce, Inc., San Francisco, CA (US)

(72) Inventors: Benjamin Busjaeger, San Carlos, CA (US); Suhas Dantkale, Cupertino, CA (US); Michael Abebe, Waterloo (CA)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/977,106

(22) Filed: Dec. 11, 2024

(51) Int. Cl.
*G06F 16/00* (2019.01)
*G06F 16/23* (2019.01)

(52) U.S. Cl.
CPC .............................. *G06F 16/2379* (2019.01)

(58) Field of Classification Search
CPC .... G06F 16/2453; G06F 3/067; G06F 40/216; G06F 16/24535; G06F 40/177; G06F 16/245; G06F 3/0481; G06F 16/2237; G06F 8/427; G06F 16/254; G06F 16/24561; G06F 16/907; G06F 16/285; G06F 3/0482; G06F 3/0656; G06F 16/23; G06F 16/24534; G06F 16/24537; G06F 16/24539; G06F 16/248; G06F 40/166; G06F 3/04847; G06F 16/2272; G06F 16/2428; G06F 21/00; G06F 16/2264; G06F 16/24575; G06F 11/1451; G06F 16/2456; G06F 16/9024; G06F 40/174; G06F 11/1469; G06F 15/17331; G06F 16/2228; G06F 16/22; G06F 16/9538; G06F 16/9566; G06F 40/274; G06F 16/278; G06F 40/183; G06F 12/1483; G06F 16/2457; G06F 16/242; G06F 40/117; G06F 40/134; G06F 16/144; G06F 16/2255; G06F 16/215; G06F 16/9535; G06F 11/1464; G06F 16/2455; G06F 16/27; G06F 16/9574; G06F 8/60; G06F 16/2372; G06F 16/951; G06F 16/2365; G06F 16/24553; G06F 3/04895; G06F 12/0261; G06F 16/2358; G06F 16/113; G06F 21/6209; G06F 40/18; G06F 3/0485; G06F 16/2308; G06F 16/2379; G06F 3/0605; G06F 12/084;
(Continued)

(56) References Cited

U.S. PATENT DOCUMENTS 8,805,978 B1 8/2014 Anthonisamy et al.
9,021,297 B1 4/2015 Hayes et al.
(Continued)

*Primary Examiner* — Yicun Wu
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed that pertain to a database system having a log owner and log tailers. The log owner maintains a transaction log and the log tailers replay the transaction log. A log tailer may receive a set of requests to perform a database transaction that involves a write operation to write a record and a subsequent read operation to read that record. As a part of performing the transaction, the log tailer may issue a request to the log owner to log the write operation in the transaction log and the log tailer may insert the record into a local memory structure of the log tailer. After receiving a response from the log owner that the write operation has been logged, the log tailer may permit the subsequent read operation to access the record from the local memory structure without requesting the record from the log owner.

20 Claims, 7 Drawing Sheets

(58) Field of Classification Search
CPC .. G06F 16/221; G06F 16/2282; G06F 3/0483; G06F 8/30; G06F 8/41; G06F 16/162; G06F 16/2246; G06F 11/2056; G06F 12/0246; G06F 12/0813; G06F 11/1666; G06F 11/2069; G06F 11/2097; G06F 11/2058; G06F 12/0875; G06F 11/2089; G06F 9/5072; G06F 16/182; G06F 11/1466; G06F 16/2329; G06F 16/2343; G06F 16/2322; G06F 11/1453; G06F 11/1471; G06F 11/1474; G06F 11/1438; G06F 11/1441; G06F 2201/80; G06F 2209/505; G06F 2212/7208; G06F 2201/84; G06F 2212/154; G06F 2201/805; G06F 2212/452; G06F 2212/1032; G06F 2212/284; G06F 2212/286; G06F 17/40; G06F 2212/60; G06F 2212/163; G06F 16/2291; G06F 2212/1052; H04L 12/18; H04L 67/568; H04L 67/1001; H04L 61/5069; H04L 63/102; H04L 51/212; H04L 67/141; H04L 69/16; H04L 67/566; H04L 63/101; H04L 67/56; H04L 51/046; H04L 67/34; H04L 67/01; H04L 67/10; H04L 67/5681; G06Q 40/04

See application file for complete search history.

(56) References Cited

U.S. PATENT DOCUMENTS

| | | | |
|---|---|---|---|
| 9,075,856 | B2 | 7/2015 | Dantkale et al. |
| 9,811,549 | B2* | 11/2017 | Schreter .............. G06F 16/2358 |
| 10,346,394 | B2 | 7/2019 | Caudy et al. |
| 2022/0382578 | A1* | 12/2022 | Budovski ................ G06F 9/466 |
| 2024/0118973 | A1* | 4/2024 | Dantkale ............. G06F 11/1466 |

* cited by examiner

MECHANISMS FOR ACCESSING DATABASE RECORDS LOCALLY

BACKGROUND

Technical Field

This disclosure relates generally to database systems and, more specifically, to various mechanisms for accessing database records locally.

Description of the Related Art

Enterprises routinely implement database management systems (or, simply "database systems") that enable users to store data in an organized manner that can be efficiently accessed and manipulated. A database system may implement any of various types of databases to store data, such as a relational database, a non-relational database, etc. During operation, a database system receives requests from users via client applications or from other systems, such as other database systems, to perform database transactions on the data that is stored in a database of the database system. A database transaction can comprise various database statements defining operations that involve reading data from the database and/or writing data to the database. For example, the database system may receive a SQL select statement to select and returns records of a database table stored in the database.

DETAILED DESCRIPTION

Figure 1:
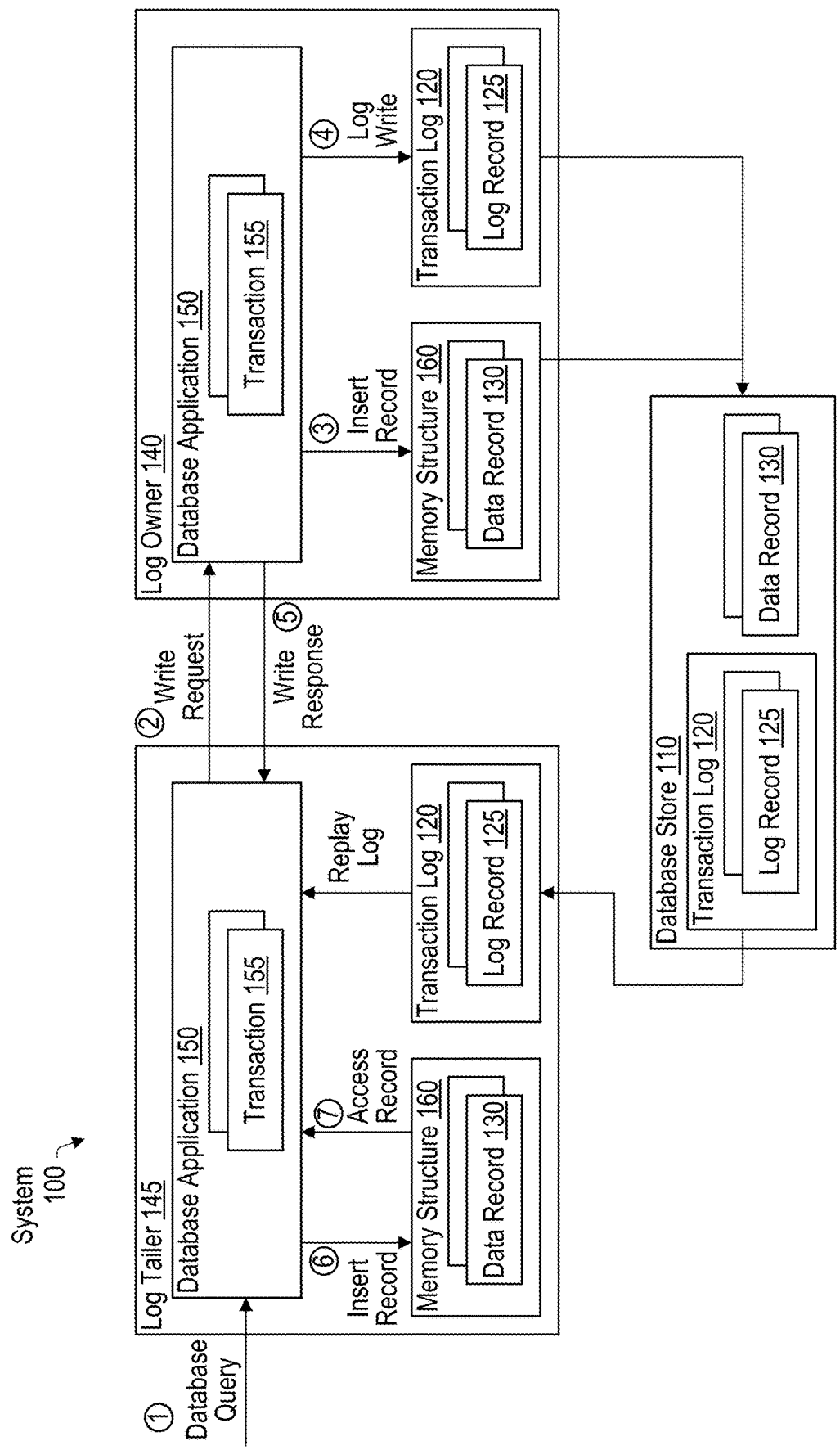
FIG. 1 is a block diagram illustrating one embodiment of a system that comprises a log owner and a log tailer.

Many database systems implement a leader-follower architecture in which a cluster of database nodes includes a leader node (herein referred to as the "log owner" or "primary node") and one or more follower nodes (herein referred to as the "log tailers," "secondary nodes," or "replica nodes"). In this architecture, the log owner maintains a transaction log that describes database operations (e.g., inserts, updates, and deletes) performed within the database system. As such, the log owner is typically responsible for processing write operations and maintaining the latest, authoritative version of the data. The log owner may insert data records into a local memory structure and separately store log records in the transaction log. As an example, if the log owner executes a SQL insert statement, then it inserts the specified data record(s) into the local memory structure and further stores, in the transaction log, a log record that identifies the execution of that SQL insert statement. If a transaction is committed, then the log owner may flush the transaction's data records to a separate storage. The log tailers are synchronized with the log owner to reflect its current state. In particular, the log tailers read the transaction log (particularly, the most recent log records (i.e., "tail" the log)) and replay operations that were performed by the log owner in order to reflect its current state. By tailing the log, the log tailers can process read requests and, if need be, fail over to become the next log owner in the event that the current log owner crashes.

Since log tailers are allowed to process read requests and only the log owner is allowed to process write requests, the conventional leader-follower architecture can scale well for reads but not writes. In order to scale writes, in various embodiments described below, log tailers are allowed to process write requests (e.g., inserts). As a part of processing a write request, a log tailer may perform the processing involved in determining what records to write and instruct the log owner to insert the record(s) into its local memory structure and log the write operations to the transaction log. By determining what records to write for the write request, the log trailer can reduce the workload that would otherwise be placed on the log owner.

But the records that the log tailer instructs the log owner to write are not inserted into the log tailer's memory structure until the log tailer replays the associated database transaction via the transaction log. A transaction, however, may read its own uncommitted records—the transaction includes a write operation to write a record and a subsequent read operation to read the record. Because the records of the transaction are not inserted into the log tailer's memory structure until the transaction is replayed via the log, in order for the transaction to read its own records, the log tailer has to issue a remote call to the log owner to request the records. The log owner searches its memory structure for the records and returns them if located. But having to reach out to the log owner results in a high overhead for transactions that read their own writes. The present disclosure addresses, among other things, the problem of how to enable a database transaction that is being executed by a log tailer to read its own records without having to reach out to the log owner.

In various embodiments that are described below, a system includes 1) a log owner that maintains a transaction log describing database operations performed in the system and 2) one or more log tailers that replay the transaction log. A log tailer may receive a set of requests to perform a database transaction that involves at least a write operation to write a record and a subsequent read operation to read the record. As a part of performing the database transaction, in various embodiments, the log tailer produces and assigns a unique transaction identifier (ID) to the transaction. The log tailer may issue a request to the log owner to log the write operation in the transaction log and thus the log owner may insert the record of the write operation into a local memory structure, log the write operation, and provide a response back to the log tailer. The log tailer may also provide (in the same request or a different one) the unique transaction ID to the log owner to include in the transaction log in order to associate the record with that unique transaction ID. Subsequent to receiving a response from the log owner that the write operation has been logged in the transaction log, in various embodiments, the log tailer inserts the record of the write operation into a local memory structure and then permits the subsequent read operation to access the record from the local memory structure without requesting it from the log owner.

When the database transaction is being replayed via the log, in various embodiments, the log tailer uses the unique transaction ID of the transaction to determine whether records of the transaction are already present in the local memory structure of the log tailer. If a record is in the local memory structure, then the log tailer skips inserting that record and proceeds to the next database operation in the transaction log; otherwise, the log tailer inserts that record into the local memory structure. Since uncommitted transactions may insert records into the local memory structure, in various embodiments, the log tailer also implements a cleanup process to help prevent the local memory structure from becoming full. In particular, the cleanup process may detect that a transaction's replay has not been started after a particular amount of time and evict the transaction's records from the local memory structure, which can ensure that there is sufficient space to insert records for transactions that are being replayed via the log.

These techniques may be advantageous as they allow for a database transaction that is being executed by a log tailer to read its own uncommitted records without having to reach out to the log owner. By inserting records into a local memory structure and allowing transactions to access their own records after the associated operations have been logged, the transactions may not have to reach out to the log owner and thus the workload that is associated with issuing remote calls and the log owner searching its own memory structure is avoided. As a result, the operation of the database system is improved. Furthermore, by assigning a unique transaction ID to a transaction and including it in the transaction log, a process that replays the transaction via the transaction log may avoid inserting duplicates of records already present in the memory structure of the log tailer. Consequently, the size of the log tailer's memory structure does not have to be increased to allow for transactions to insert their records into the memory structure. Also, by implementing a cleanup process, the log tailer may ensure that the memory structure has sufficient space for transactions that are being replayed via the transaction log even in view of uncommitted transactions inserting records into the memory structure.

Turning now to FIG. 1, a block diagram of a system 100 is shown. System 100 includes a set of components that may be implemented via hardware or a combination of hardware and software routines. In the illustrated embodiment, system 100 includes a database store 110, a log owner 140, and a log tailer 145. As further shown, log owner 140 and log tailer 145 each include an instance of a database application 150 (that executes transactions 155), an instance of a transaction log 120 (that includes log records 125), and an instance of a memory structure 160 (that includes data records 130). Also as shown, database store 110 includes an instance of transaction log 120 and data records 130. The illustrated embodiment may be implemented differently than shown. For example, system 100 can include multiple log tailers 145 that form a database cluster with log owner 140. Accordingly, it is noted that the number of components of system 100 (and the number of subcomponents for those shown in FIG. 1) may vary between embodiments. Thus, there can be more or fewer of each component or subcomponent than the number shown in FIG. 1

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, stores, and other entities that are associated with system 100. In various embodiments, system 100 is implemented using a cloud infrastructure that is provided by a cloud provider. Thus, database store 110, log owner 140, and log tailer 145 may use the available cloud resources of the cloud infrastructure (e.g., computing resources, storage resources, etc.) in order to facilitate their operation. For example, software for implementing database application 150 can be stored on a non-transitory computer readable storage medium of server-based hardware that is included in a datacenter of the cloud provider and executed in a virtual machine that is hosted on the server-based hardware. Various components of system 100 may be implemented without the assistance of a virtual machine or other deployment technologies such as containerization. In some embodiments, system 100 is implemented using a local or private infrastructure as opposed to a public cloud.

Database store 110, in various embodiments, includes a collection of data organized in a manner that allows for access, storage, and manipulation of the data. Database store 110 may include supporting software (e.g., storage nodes) that enables database nodes (e.g., log owner 140 and log tailer 145) to carry out the operations (e.g., accessing, storing, etc.) on data that is stored at database store 110. In various embodiments, database store 110 is implemented using a single or multiple storage devices connected together on a network (e.g., a storage attached network (SAN)) and configured to redundantly store data in order to prevent data loss. These storage devices may store data persistently and thus database store 110 may serve as persistent storage for system 100. Further, as discussed, components of system 100 may use the available cloud resources of a cloud infrastructure and thus database store 110 may be a storage service provided by a cloud provider (e.g., Amazon S3®). Also, the data written to database store 110 by one database node (e.g., log owner 140) may be accessible to other database nodes (e.g., log tailer 145) in a multi-node configuration (e.g., a node cluster or a system having multiple node clusters spread across different zones provided by a cloud provider).

In various embodiments, database store 110 stores at least two types of files: data files and log files. A data file may comprise the actual data and may be append-only such that new data records 130 are appended to the data file until its size reaches a threshold and another data file is created. A data record 130, in various embodiments, comprises data and a database key that is usable to look up that data record 130. For example, a data record 130 may correspond to a row in a database table, where the record specifies values for attributes of the table. A log file may comprise log records 125 that describe database modifications (e.g., record insertions) resulting from executing database transactions 155. As with data files, log files may be append-only and continuously receive appends as transactions 155 do work. In various embodiments, transaction log 120 is a set of log files having log records 125 that collectively identify a state of the database system implemented by system 100. Transaction log 120 may thus record every change (inserts, updates, deletes) made to the database stored at database store 110. By reading transaction log 120, a database node (e.g., log tailer 145) may determine an ordering in which database operations were performed in system 100, including an ordering in which transactions 155 committed. Data files and log files, in various embodiments, are assigned file IDs that can be used to locate them. Log owner 140 and log tailer 145 may access data records 130 and log records 125 from database store 110 by issuing access requests with file IDs to storage nodes that implement database store 110.

Log owner 140 and log tailer 145, in various embodiments, are database nodes that can facilitate database services, such as data retrieval and/or data storage. In various embodiments, database nodes are software, but in other embodiments, they encompasses both hardware and software. A database node may operate in at least two different modes: a primary or log owner mode and a secondary or log tailer mode. Thus, in the illustrated embodiment, log owner 140 may be a database node operating in the log owner mode while log tailer 145 may be a database node operating in the log tailer mode. If log owner 140 crashes, the database node operating as log tailer 145 may transition to the log owner mode and thus operate as the next log owner 140 as a result. Log owner 140, in various embodiments, is responsible for creating and maintaining transaction log 120. Log owner 140 may thus manage the persistence of log records 125 (e.g., by storing them at database store 110) and ensure that they are available for other components, such as log tailer 145, to access. Log tailer 145, in various embodiments, reads transaction log 120 (particularly, the most recent log records 125) and replays read log records 125 to recreate the state of the log owner's memory structure 160. As shown in FIG. 1, log tailer 145 can access transaction log 120 from database store 110 (particularly, the most recent log records 125 after log owner 140 has written them out to database store 110), store a local instance of transaction log 120, and replay log records 125 from it. As a result of replaying log records 125, log tailer 145 may be able to return data records 130 from its memory structure 160 as part of processing transactions and, in the event that log owner 140 becomes unavailable (e.g., crashes), become the next log owner of transaction log 120.

In various embodiments, log owner 140 and log tailer 145 implement a database system together. This database system may be a relational database system, such as PostgreSQL®. In various embodiments, log owner 140 and log tailer 145 implement a multi-tenant system that allows multiple tenants to each store a respective set of data in database store 110. For example, database store 110 may store a first set of data for a non-profit organization (a first tenant) and a second set of data for a company (a second tenant). In that embodiment, the database system implemented by log owner 140 and log tailer 145 may employ security measures to ensure that one tenant's data is isolated from another's data to prevent one tenant from accessing another tenant's data (without authorization).

Database services of log owner 140 and log tailer 145 may be provided to components within or external to system 100. As an example, log owner 140 may receive database queries from a client application to perform one or more database operations for a database transaction 155. A database transaction 155, in various embodiments, is a logical unit of work (e.g., one or more database statements). For example, processing a database transaction 155 may include executing a SQL select statement to select and return one or more rows from a database table. The contents of a row may be specified in a data record 130 and therefore log owner 140 may return one or more data records 130 (corresponding to the rows) to the client application. The database queries that are received by log owner 140 and log tailer 145 may be expressed using the structured query language (SQL) or another query declarative language.

Database application 150, in various embodiments, is software executable to provide a set of database services (e.g., access, manipulate, and/or store data). Thus, database application 150 may receive database queries (e.g., a SQL select statement) as part of database transactions 155 and process them. To process a query, database application 150 may execute a query plan (also referred to as an "execution plan") that defines a sequence of steps to be executed in order to implement that query. In various cases, database application 150 may generate one or more query plans, select one of them based on a scoring mechanism, and execute the selected query plan, all within a single execution flow (e.g., that is triggered by a request to execute a database query). In other cases, database application 150 may receive a request to generate one or more query plans for a query and separately receive a request to execute the query with certain values in accordance with one of those query plans. As part of executing a database query, in various embodiments, database application 150 may generate data records 130 and log records 125 (if executing on log owner 140). Database application 150 may store data records 130 in its local memory structure 160.

Memory structure 160, in various embodiments, is an in-memory buffer that stores data (e.g., data records 130) in memory (e.g., random access memory) before being written to disk. HBase™ Memstore is one example of memory structure 160. In various embodiments, data records 130 are stored in files as part of a log-structured merge tree (LSM tree) that organizes the files using a level-based scheme. In particular, database application 150 may initially insert data records 130 into memory structure 160. As memory structure 160 becomes full and/or at particular points in time, database application 150 may flush data records 130 from its memory structure 160 to database store 110. As part of flushing the records, database application 150 may write them into new files that are stored in one of the multiple levels (e.g., the top level) of the LSM tree. Over time, those records are rewritten into new files stored in lower levels as they are merged down the LSM tree. In various embodiments, when log tailer 145 flushes its memory structure 160, it may evict data records 130 without writing them out to database store 110 because those records may already be stored at database store 110 as a result of a flush by log owner 140.

In various embodiments, log tailer 145 processes both read and write transactions 155, and write transactions 155 are permitted to access their own writes (data records 130) from log tailer's memory structure 160. Accordingly, log tailer 145 may process a write transaction 155 involving at least a write operation to write a data record 130 and a subsequent read operation to read that data record 130—that write transaction 155 may involve multiple write operations and multiple read operations that read writes from one or more of those write operations. Log tailer 145 may initially receive a set of database queries (as shown) for such a write transaction 155. When processing a write operation (e.g., a SQL insert, a SQL update, etc.), log tailer 145, in various embodiments, determines what data records 130 to write for that write operation. In many cases, writing a data record 130 for a database table may also involve writing additional data records 130. For example, writing a data record 130 that represents a new purchase of an item may also involve updating an inventory of the item. As such, the write operation involves writing at least two data records 130.

After log tailer 145 determines what data records 130 to write for a write operation, in various embodiments, log tailer 145 issues a write request (as shown) to log owner 140 to insert the determined data record(s) 130 into its memory structure 160 and log the write operation to transaction log 120. Log owner 140 may first determine whether the write operation conflicts with other write operations (e.g., performed by log owner 140 or other log trailers 145). If no conflict exists, then log owner 140 inserts the data record(s) 130 into its memory structure 160 and logs the write operation to transaction log 120 in a log record 125. While inserting the data records 130 is depicted in FIG. 1 as occurring before logging the write operation in transaction log 120, in some embodiments, log owner 140 first logs the write operation in transaction log 120 before inserting the data records 130 into its memory structure 160. Once the data records 130 have been inserted and the write operation has been logged, in various embodiments, log owner 140 returns a success write response to log tailer 145. But if log owner 140 was not able to insert the data records 130 or log the write operation, then log owner 140 may return a write response indicating a failure.

Upon receiving a write response indicating that the data records 130 were successfully inserted and the write operation was successfully logged, log tailer 145 inserts the data records 130 into its memory structure 160, as shown. In some embodiments, log tailer 145 inserts the data records 130 into its memory structure 160 before issuing the write request to log owner 140 or after issuing the write request but before receive the write response. When processing the subsequent read operation, log tailer 145 may access the data record(s) 130 being read from its memory structure 160 instead of requesting them from log owner 140 (e.g., via a remote procedure call (RPC)). As discussed in detail with respect to FIG. 2, log tailer 145 can assign a unique transaction ID to a transaction 155. This unique transaction ID may be used by log tailer 145 to control record insertions into memory structure 160 (as discussed in more detail with respect to FIG. 2) and prevent duplicate data records 130 from being inserted into memory structure 160 during log replay (as discussed in more detail with respect to FIG. 3).

Figure 2:
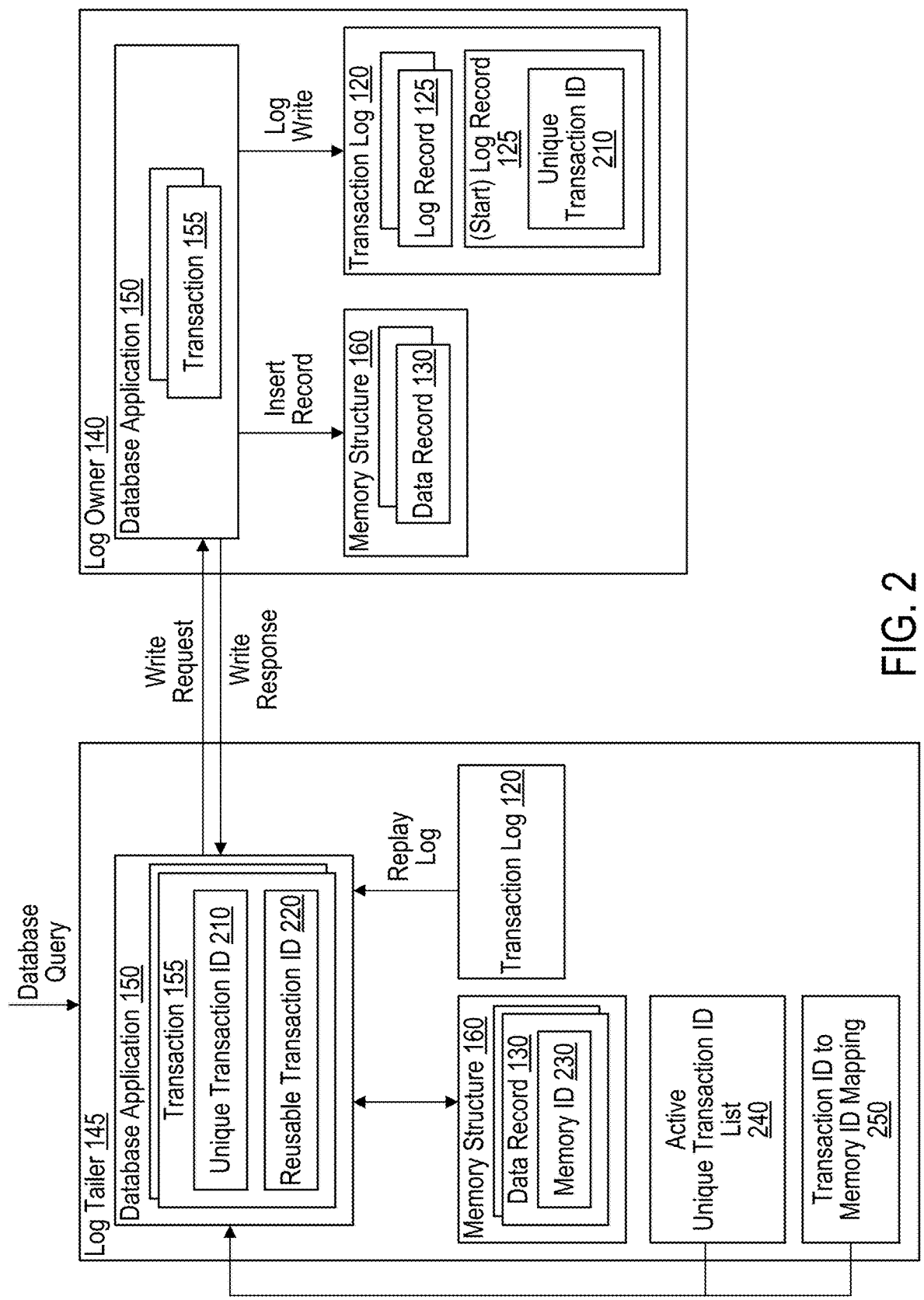
FIG. 2 is a block diagram illustrating one embodiment of a process in which a log tailer inserts records of a transaction into a memory structure of the log tailer.

Turning now to FIG. 2, a block diagram of one embodiment of a process in which log tailer 145 inserts data records 130 of transactions 155 into its memory structure 160 is shown. In the illustrated embodiment, there is log owner 140 and log tailer 145. As shown, log owner 140 and log tailer 145 each implement an instance of database application 150, an instance of transaction log 120, and an instance of memory structure 160. As further shown, log tailer 145 includes an active unique transaction ID list 240 and a transaction ID to memory ID mapping 250, and transactions 155 are associated with both a unique transaction ID 210 and a reusable transaction ID 220. Moreover, data records 130 in memory structure 160 of log tailer 145 are associated with a memory ID 230. The illustrated embodiment may be implemented differently than shown. For example, data records 130 in memory structure 160 of log tailer 145 may be associated with their transaction's unique transaction ID 210 instead of a memory ID 230.

In various embodiments, log tailer 145 assigns a unique transaction ID 210 to a given transaction 155. A unique transaction ID 210, in various embodiments, is a value that uniquely identifies a transaction 155 from other transactions 155 executed by log owner 140, log tailer 145, or other log tailers 145. Since log tailer 145 may replay transactions 155 executed by other database nodes, a unique transaction ID 210 may include a portion that identifies log tailer 145 (e.g., a node identifier). Furthermore, a unique transaction ID 210 may include a portion that identifies a transaction sequence number that is maintained by log tailer 145, which might be incremented each time log tailer 145 generates a unique transaction ID 210. To ensure that log tailer 145 does not generate the same unique transaction ID 210, e.g., after restarting, in some embodiments, the transaction sequence number is generated based on a time component (e.g., based on timestamps assigned using a local clock of log tailer 145 that may be synchronized with clocks of other database nodes (e.g., log owner 140 and other log tailers 145)). Together the node identifier and the transaction sequence number may result in a transaction ID 210 that is unique amongst transactions 155 (e.g., within a cluster of database nodes, within an entire database fleet, etc.).

In various embodiments, log tailer 145 further assigns a reusable transaction ID 220 to a given transaction 155. A reusable transaction ID 220, in various embodiments, is a value that can be used to bind, or otherwise associate, a transaction 155 with the backend process that is executing the transaction 155. A reusable transaction ID 220 may be released after a transaction 155 has committed or aborted from the perspective of the backend process and then reused to bind another transaction 155 to a backend process. In particular, when committing or aborting a transaction 155, in various embodiments, log tailer 145 issues a commit request (or an abort request) to log owner 140. In response to the request, log owner 140 may log the commit (or abort) of the transaction 155 in transaction log 120 and return a response to log tailer 145. After receiving that response, log tailer 145 may indicate the outcome (e.g., committed) to the client that initiated the transaction 155 and release the transaction's reusable transaction ID 220 for use in a subsequent transaction 155. Since a reusable transaction ID 220 may be used by more than one transaction 155, a reusable transaction ID 220 does not uniquely identify a transaction 155. In various embodiments, the number of reusable transaction IDs 220 is fixed and used to control the number of transactions 155 that are being executed at given point in time.

Since a reusable transaction ID 220 is reused while a unique transaction ID 210 is not, the reusable transaction ID 220 and the unique transaction ID 210 have different lifecycles in regard to a transaction 155. In particular, the lifecycle of a reusable transaction ID 220 may be from when it is assigned to a transaction 155 to when it is released after the transaction 155 is committed from the perspective of the transaction's backend process. The lifecycle of a unique transaction ID 210 extends beyond when the transaction 155 is committed from the perspective of the transaction's backend process. Many database systems utilize reusable transaction IDs 220 to bind transactions 155 to backend processes. Due to the lifecycle and reusability of these reusable transaction IDs 220, issues can arise when allowing transactions 155 to insert records 130 into the log tailer's memory structure 160. In particular, as discussed in greater detail with respect to FIG. 3, when replaying transactions 155 from transaction log 120, log tailer 145 may prevent duplicate data records 130 from being inserted into memory structure 160. If reusable transaction IDs 220 are used to associate data records 130 with transactions 155 (that is, if data records 130 are stamped only with reusable transaction IDs 220 and not unique transaction IDs 210 or memory IDs 230), then log tailer 145 might not be able to determine which transaction 155 wrote a data record 130 if that data record's reusable transaction ID 220 is used by multiple transactions 155. Consequently, an transaction ID with a longer lifecycle is desirable and thus log tailer 145 may assign a unique transaction ID 210 to a transaction 155. While a transaction 155 is shown as being assigned both a unique transaction ID 210 and a reusable transaction ID 220, in some embodiments, log trailer 145 assigns only a unique transaction ID 210 and not a reusable transaction ID 220 to a transaction 155.

A transaction's unique transaction ID 210, in various embodiments, is provided to log owner 140 (e.g., via write requests) to include in transaction log 120. In various embodiments, when logging the first write operation performed by a transaction 155, log owner 140 inserts a start log record 125 into transaction log 120 that associates any write operations performed by that transaction 155 with the transaction's unique transaction ID 210. Thus, when logging any subsequent write operations performed by the transaction 155, log owner 140 may not include the transaction's unique transaction ID 210 in the corresponding log records 125. But in some embodiments, when logging write operations, log owner 140 includes the transaction's unique transaction ID 210 in each corresponding log record 125. By including a transaction's unique transaction ID 210 in transaction log 120, when the transaction 155 is replayed via transaction log 120, the replay process may be able to determine whether the transaction 155 inserted any records 130 into the log tailer's memory structure 160 and thus may prevent duplicate records 130 from being inserted into log tailer's memory structure 160.

Active unique transaction ID list 240, in various embodiments, is a list that identifies unique transaction IDs 210 of transactions 155 started by backend processes but have not been committed or aborted via replaying transaction log 120. In various embodiments, active unique transaction ID list 240 is implemented as a map or table and may be optimized for both lookup by unique transaction ID 210 and reverse lookup by memory ID 230. A unique transaction ID 210 may be generated when a transaction 155 is started and added to list 240 upon the first write operation being performed by the transaction 155. In some embodiments, the unique transaction ID 210 is added to list 240 after generating it without waiting for the transaction 155 to perform a write operation. List 240 may be used to guard against a race condition in which a backend process attempts to write a data record 130 to the log tailer's memory structure 160 after the associated transaction 155 has already been aborted by a log replay process that is replaying transaction log 120. In particular, log owner 140 may abort a transaction 155 being executed by log tailer 145 without informing the backend process that is executing the transaction 155. As discussed below, list 240 may prevent the backend process from inserting a data record 130 into the log tailer's memory structure 160 after its associated transaction 155 has been aborted.

After sending a write request for a write operation to log owner 140, if log tailer 145 receives a success write response, then, in various embodiments, log tailer 145 checks list 240 for the transaction's unique transaction ID 210 and, if present, inserts the data record(s) 130 of the write operation into the log tailer's memory structure 160. But if that transaction's unique transaction ID 210 is not present on list 240, then log tailer 145 may terminate the transaction's backend process and provide an abort response to the client that triggered the transaction 155. If log tailer 145 receives a failure write response from log owner 140 for the write operation, then log tailer 145 may check list 240 for the transaction's unique transaction ID 210. If that unique transaction ID 210 is present, then log tailer 145 may determine if its memory structure 160 includes any data records 130 associated with the transaction 155. If there are no records 130, then log tailer 145 may remove the transaction's unique transaction ID 210 from list 240 and provide an abort response to the client that triggered the transaction 155. The transaction's unique transaction ID 210 may also be removed from list 240 if a log replay process replaying transaction log 120 detects that the transaction has been aborted. In such a case, the log replay process may remove any state (e.g., data records 130) associated with the transaction 155 from the log tailer's memory structure 160 as well. Accordingly, if log tailer 145 receives a failure write response from log owner 140 and the corresponding transaction 155 has data records 130 present in the log tailer's memory structure 160, in some embodiments, log tailer 145 does not remove those data records 130 until a log replay process at log tailer 145 removes them as part of replaying transaction log 120. In the case that the replay process commits a transaction 155, the replay process may remove the transaction unique transaction ID 210 from list 240.

When a data record 130 is inserted into the log tailer's memory structure 160, in various embodiments, log tailer 145 includes, in the data record 130 or otherwise associates with that data record 130, a memory ID 230. Unique transaction IDs 210 may be several bytes long (e.g., 16 bytes) and thus to converse space in the log tailer's memory structure 160, memory IDs 230 may be used instead. In some embodiments, log tailer 145 includes, in the data record 130, its transaction's unique transaction ID 210. A memory ID 230, in various embodiments, is a value used to identify a transaction 155 and its data records 130 in the log tailer's memory structure 160. A memory ID 230 may be 8 bytes long and thus have a smaller memory footprint than a unique transaction ID 210. When a transaction 155 performs its first write operation, a memory ID 230 may be allocated by log tailer 145 to the transaction 155 and stored in mapping 250 to associate the transaction's unique transaction ID 210 with its memory ID 230. As discussed in greater detail with respect to FIG. 3, when replaying transaction log 120, log tailer 145 may use mapping 250 to determine whether a data record 130 has already been inserted in its memory structure 160.

Figure 3:
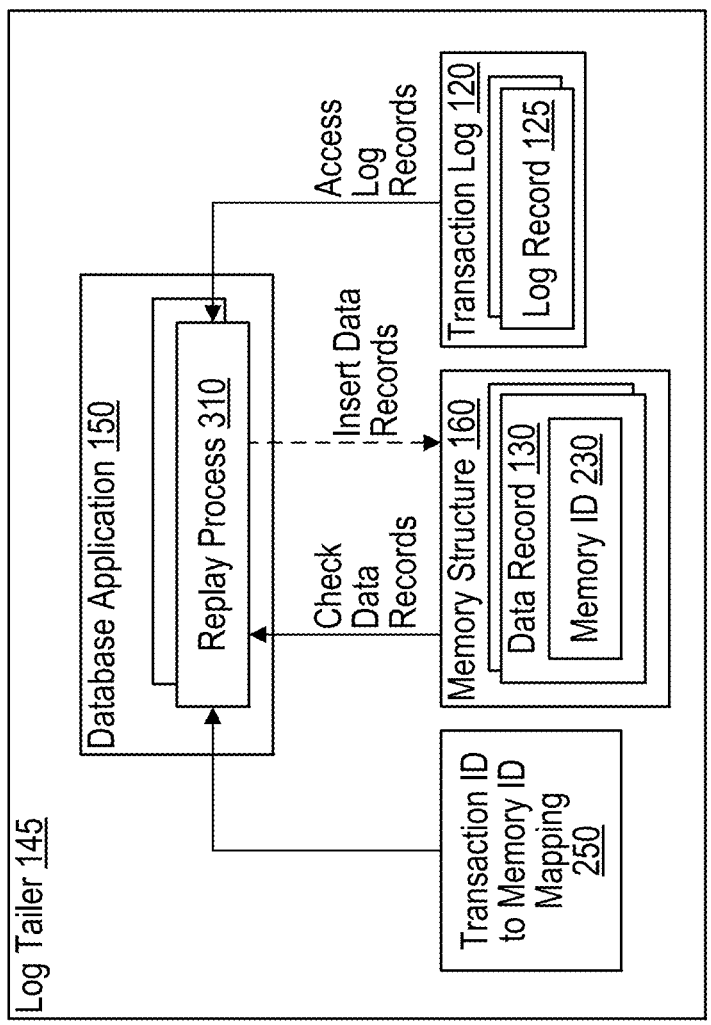
FIG. 3 is a block diagram illustrating one embodiment in which replay processes prevent duplicate records from being inserted into a memory structure of a log tailer when replaying a transaction log.

Turning now to FIG. 3, a block diagram of one embodiment in which replay processes 310 prevent duplicate data records 130 from being inserted into a log tailer's memory structure 160 when replaying transaction log 120 is shown. In the illustrated embodiment, log tailer 145 includes transaction log 120, database application 150 (that implements replay processes 310), memory structure 160, and transaction ID to memory ID mapping 250. As shown, data records 130 stored in memory structure 160 include memory IDs 230. The illustrated embodiment may be implemented differently than shown. As an example, data records 130 may include unique transaction IDs 210 instead of memory IDs 230 and thus log tailer 145 may not utilize mapping 250.

Replay processes 310, in various embodiments, are computer processes that replay log records 125 accessed from transaction log 120. Replay processes 310 may replay log records 125 inserted into redo queues by a set of reader processes (not shown). In particular, in various embodiments, database application 150 implements reader processes that retrieve log records 125 from database store 110 (e.g., by reading the "tail" of transaction log 120 at database store 110) and enqueue those log records 125 in redo queues, which may be first in, first out (FIFO) structures. To retrieve those log records 125 from database store 110, the reader processes may consult a storage catalog that includes details about transaction log 120, including the locations of log files that comprises log records 125. When log owner 140 creates a log file, it may store information in the storage catalog that identifies the location of that log file. Accordingly, the reader processes may access that information and then use it to begin reading log records 125 from that log file.

Accordingly, as log records 125 are inserted into the redo queues, replay processes 310 may access them and replay them. As mentioned, a log record 125 may identify one or more database operations (e.g., insert, update, etc.) that are performed as part of processing database transactions 155. In various embodiments, replaying a log record 125 includes performing the one or more database operations identified by that log record 125. As a result, a replay process 310 may insert data records 130 (e.g., the data record(s) 130 resulting from an insert operation) into memory structure 160, as shown. In some embodiments, replay processes 310 replay log records 125 in parallel, where a given replay process 310 replays the log records 125 detailing a particular database transaction 155. As a result, multiple transactions 155 can be replayed in parallel by using multiple replay processes 310.

Because transactions 155 may insert data records 130 into memory structure 160 before being replayed later by a replay process 310, the same data records 130 that would be inserted by the replay process 310 may already be present in memory structure 160. That is, when log tailer 145 executes a transaction 155, it may insert data records 130 into memory structure 160 that are generated by the transaction 155 so that the transaction 155 can read those data records 130 (for read operations occurring after their insertion) without requesting those records from log owner 140, as discussed. When the transaction's operations are performed again as part of replaying transaction log 120, those data records 130 may still be present in memory structure 160 (unless, e.g., they are evicted as part of a cleanup process, as discussed in more detail with respect to FIG. 4.). In order to avoid inserting those data records 130 into memory structure 160 such that there are multiple copies of the same data record 130, in various embodiments, replay processes 310 determine whether those data records 130 are in memory structure 160.

When replaying a write operation, in various embodiments, a replay process 310 checks whether active unique transaction ID list 240 specifies the unique transaction ID 210 assigned to the write operation's transaction 155. If the unique transaction ID 210 is present on list 240, then the replay process 310 may skip inserting the data record(s) 130 associated with the write operation. But if the unique transaction ID 210 is not present, then the replay process 310 may insert those data record 130 into memory structure 160. Alternatively, the replay process 310 may check whether mapping 250 identifies a mapping between the unique transaction ID 210 and a memory ID 230 and skip the insertion if the mapping is present. In some embodiments, a replay process 310 may attempt to find a data record 130 by searching memory structure 160 using a memory ID 230 obtained from mapping 250 based on the unique transaction ID 210. If the data record 130 is found, then the replay process 310 may skip inserting that data record 130 again; otherwise, the replay process 310 may insert the data record 130.

When replaying an abort log record 125, in various embodiments, a replay process 310 checks whether active unique transaction ID list 240 specifies the unique transaction ID 210 assigned to the associated transaction 155. If that unique transaction ID 210 is present on list 240, then the replay process 310 may access a memory ID 230 from mapping 250 based on the unique transaction ID 210 and evict data records 130 that have been stamped with the memory ID 230. In embodiments in which data records 130 are stamped with the unique transaction ID 210 of their transaction 155, then the replay process 310 may evict data records 130 that have been stamped with that unique transaction ID 210. After clearing memory structure 160 of any state associated with a transaction 155, the replay process 310 may remove the transaction's unique transaction ID 210 from list 240 and the appropriate mapping from mapping 250.

When replaying a commit log record 125, in various embodiments, a replay process 310 checks whether active unique transaction ID list 240 specifies the unique transaction ID 210 assigned to the associated transaction 155. If that unique transaction ID 210 is present on list 240, then the replay process 310 may ensure that all data records 130 written by the transaction 155 are present in memory structure 160 and then commit them. To ensure that all data records 130 are present, in various embodiments, the replay process 310 computes a rolling checksum of all operations performed via replaying the transaction 155 and compares it against a rolling checksum computed from all operations that were performed during the original execution of the transaction 155. If there is a match, then this is indicative that all relevant data records 130 are present in memory structure 160 and thus the commit can proceed. If there is a mismatch, then an error has occurred and the replay process 310 may replay the transaction 155 without skipping any write operations. After committing a transaction 155 the replay process 310 may remove the transaction's unique transaction ID 210 from list 240 and the appropriate mapping from mapping 250.

Figure 4:
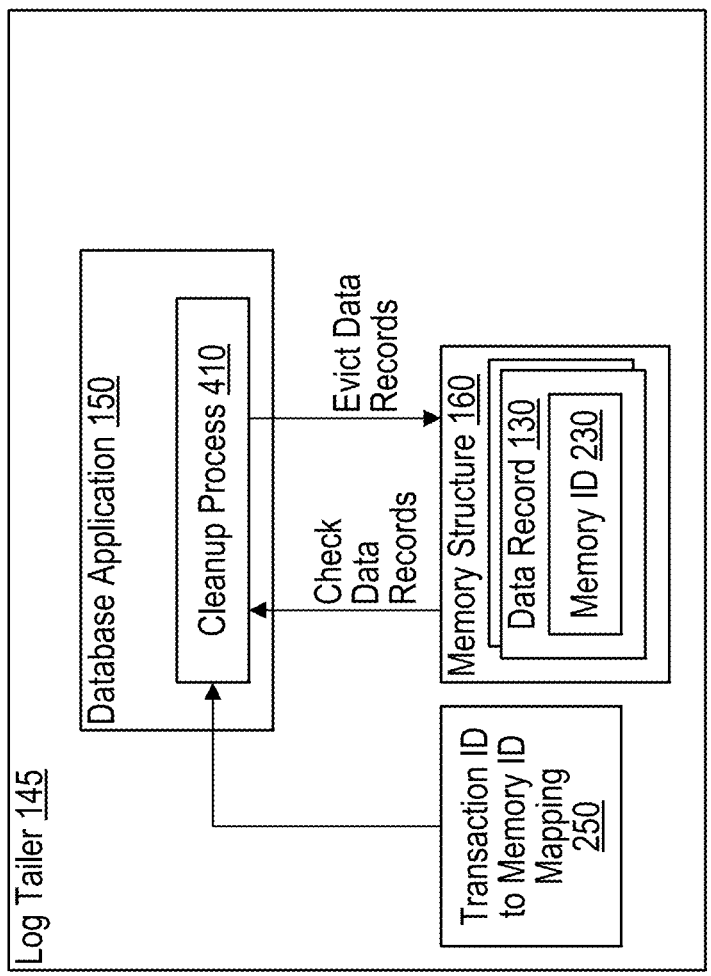
FIG. 4 is a block diagram illustrating one embodiment in which a cleanup process evicts records from a memory structure of a log tailer.

Turning now to FIG. 4, a block diagram of one embodiment in which a cleanup process 410 evicts data records 130 from a log tailer's memory structure is shown. In the illustrated embodiment, log tailer 145 includes database application 150 (that implements cleanup process 410), memory structure 160, and mapping 250. As further shown, data records 130 in memory structure 160 include memory IDs 230. The illustrated embodiment may be implemented differently than shown. As an example, data records 130 may include unique transaction IDs 210 instead of memory IDs 230 and thus log tailer 145 may not utilize mapping 250.

As discussed, as memory structure 160 becomes full and/or at particular points in time, log tailer 145 may flush particular data records 130 from its memory structure 160. In various embodiments, log tailer 145 flushes only committed data records 130 that are committed by a replay process 310 replaying transaction log 120. If memory structure 160 reaches a fullness threshold, a replay process 310 may halt replaying log records 125 of transaction log 120 until a flush operation is performed to evict committed data records 130 to free up memory space in memory structure 160. Since transactions 155 may insert their data records 130 into memory structure 160, a deadlock can arise where memory structure 160 reaches the fullness threshold but stores uncommitted data records 130 and no committed data records 130. Replay processes 310 halt because memory structure 160 is full and thus no commits occur while they are halted. Since there are no committed data records 130, no data records 130 are flushed, resulting in a deadlock as those replay processes 310 remain halted. To prevent this deadlock from occurring, in various embodiments, database application 150 implements cleanup process 410.

Cleanup process 410, in various embodiments, is a computer process that evicts records 130 that have been inserted into memory structure 160 by transactions 155 that have not been committed by a replay process 310. In some embodiments, log tailer 145 implements a cleanup queue that stores time-stamped unique transaction IDs 210. In particular, based on receiving a success commit response from log owner 140 for a transaction 155, log tailer 145 may enqueue, in the cleanup queue, the transaction's unique transaction ID 210 with a timestamp indicative of the current time. Cleanup process 410 may periodically check the queue and compare that timestamp plus a delay interval (e.g., 30 seconds) against the current time. If the current time is greater than the deadline time (the timestamp plus the delay interval), then cleanup process 410 may evict the data records 130 associated with the transaction 155 from memory structure 160. Cleanup process 410 may access a memory ID 230 from mapping 250 based on the unique transaction ID 120 and then evict data records 130 having that memory ID 230. In various embodiments, cleanup process 410 sets a state associated with the transaction 155 to a cleaning up state to cause the replay process 310 that replays the transaction 155 to not skip any write operations as the data records 130 associated with that transaction 155 are being evicted from memory structure 160.

Other criteria may be assessed by cleanup process 410 to trigger a cleanup. In various embodiments, if memory structure 160 reaches a fullness threshold, then cleanup process 410 may begin evicting data records 130 associated with the oldest transactions 155 in the cleanup queue. In various embodiments, if no memory IDs 230 are available to assign to transactions 155, then cleanup process 410 may begin evicting data records 130 associated with the oldest transactions 155 in the cleanup queue. Also, if a replay process 310 starts replaying a particular transaction 155, then, in some embodiments, the replay process 310 removes the transaction's unique transaction ID 210 from the cleanup queue to prevent cleanup process 410 from starting to evict data records 130 from memory structure 160 that are associated with that transaction 155.

Figure 5:
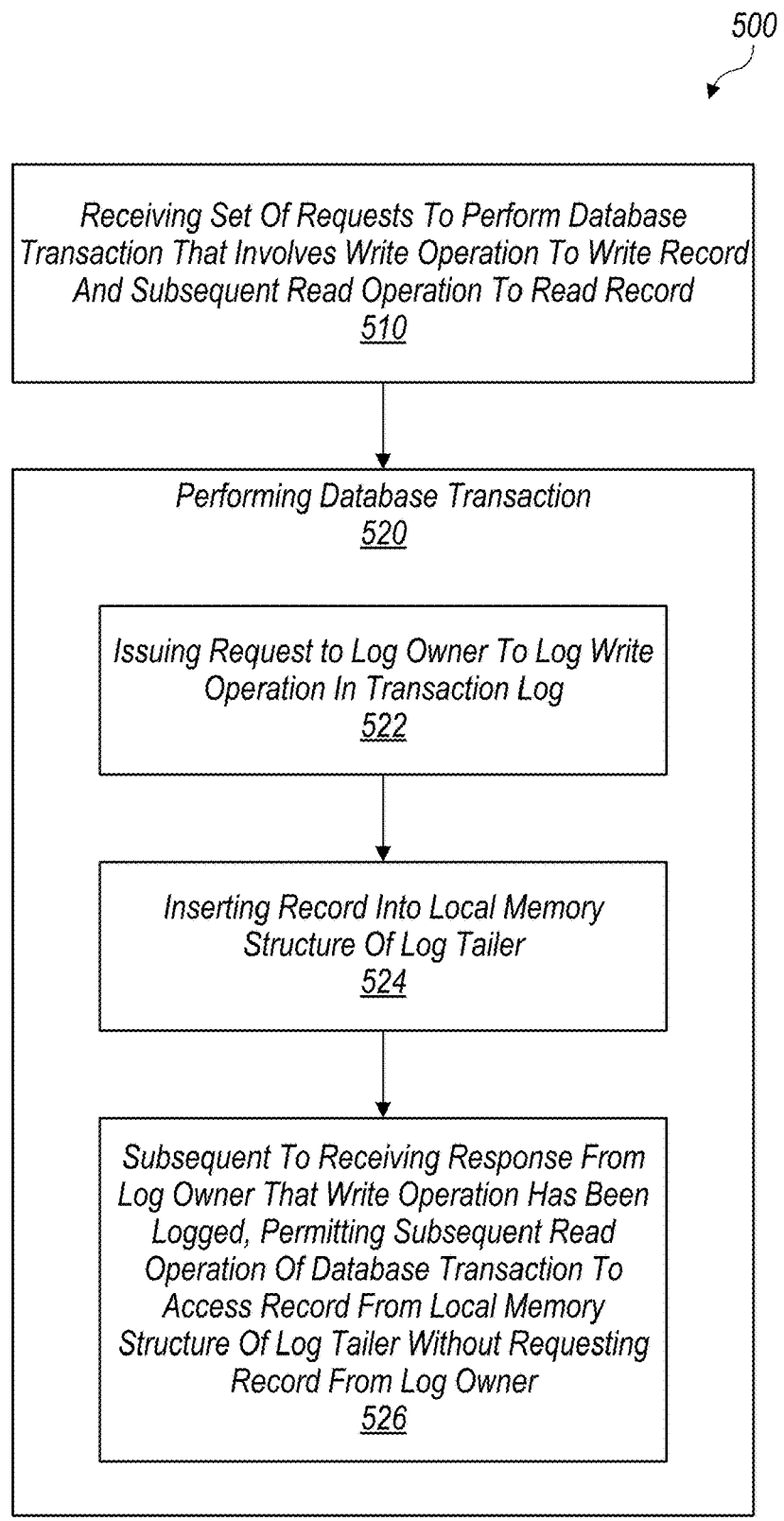
FIGS. 5 and 6 are flow diagrams illustrating example methods that pertain to accessing records locally without requesting the records from a log owner.

Turning now to FIG. 5, a flow diagram of a method 500 is shown. Method 500 is one embodiment of a method performed by a log tailer (e.g., log tailer 145) to access records locally without requesting those records from a log owner (e.g., log owner 140). Method 500 may be performed by a computer system executing program instructions stored on a non-transitory computer-readable medium. Method 500 may include more or fewer steps than shown or be performed in a different order. For example, method 500 may include a step in which the log tailer assigns a unique transaction identifier (e.g., a unique transaction ID 210).

Method 500 begins in step 510 with the log tailer receiving a set of requests to perform a database transaction that involves a write operation to write a record and a subsequent read operation to read the record. In various embodiments, the log tailer is part of a database system having 1) a log owner that maintains a transaction log (e.g., transaction log 120) that describes operations (e.g., inserts, deletes, etc.) performed within the database system and 2) a plurality of log tailers that replay the transaction log.

In step 520, the log trailer performs the database transaction. As part of performing the database transaction, in step 522, the log tailer issues a request to the log owner to log the write operation in the transaction log. The log tailer may assign a unique transaction identifier to the database transaction and further provide it to the log owner to include in the transaction log to associate the record with the unique transaction identifier. The unique transaction identifier may be provided in an initial request to the log owner to log an initial write operation of the database transaction and excluded from one or more subsequent requests to the log owner to log write operations of the database transaction. The unique transaction identifier, in various embodiments, is usable by the log tailer to prevent a duplicate of the record from being inserted into a local memory structure (e.g., memory structure 160 of log tailer 145) during a replay of the transaction log.

A first portion of the unique transaction identifier may identify the log tailer from the plurality of log tailers and a second portion of the unique transaction identifier may identify a transaction sequence number generated by the log tailer. In various embodiments, the log tailer assigns a reusable transaction identifier (e.g., a reusable transaction ID 220) to the database transaction that has a different lifecycle than the unique transaction identifier. The reusable transaction identifier may be released after the database transaction is committed (or aborted) from the perspective of a backend process, at which point the reusable transaction identifier may be assigned to another transaction.

As part of performing the database transaction, in step 524, the log tailer further inserts the record into the local memory structure of the log tailer. Subsequent to the assigning of the unique transaction identifier to the database transaction, the log tailer may add that identifier to an active list (e.g., list 240). Before inserting the record into the local memory structure, the log tailer may determine whether the unique transaction identifier is present on the active list, and, if so, perform step 524; otherwise, the record may not be inserted. In some embodiments, the record is inserted with a memory identifier (e.g., a memory ID 230) into the local memory structure as the memory identifier may have a smaller memory size than the unique transaction identifier. The log tailer may maintain a mapping (e.g., mapping 250) between the memory identifier and the unique transaction identifier. The log tailer may determine, during the replay of the database transaction, that the record is present in the local memory structure based on the mapping and thus not insert a duplicate of the record.

As part of performing the database transaction, in step 526, subsequent to receiving a response from the log owner that the write operation has been logged, the log tailer permits the subsequent read operation of the database transaction to access the record from the log tailer's local memory structure without requesting the record from the log owner. The inserting of the record into the local memory structure may be performed subsequent to receiving the response from the log owner. In some embodiments, the log tailer determines whether the replay of the database transaction via the transaction log has been initiated within a threshold amount of time (e.g., 30 seconds) after the transaction has been committed. In response to determining that the replay of the database transaction has not been initiated within the threshold amount of time, the log tailer may evict the record from the local memory structure. The log tailer may also determine whether the local memory structure satisfies a fullness threshold (e.g., is 90% full). In response to determining that the local memory structure satisfies the fullness threshold, the log tailer may prevent uncommitted database transactions from inserting records into the local memory structure.

Figure 6:
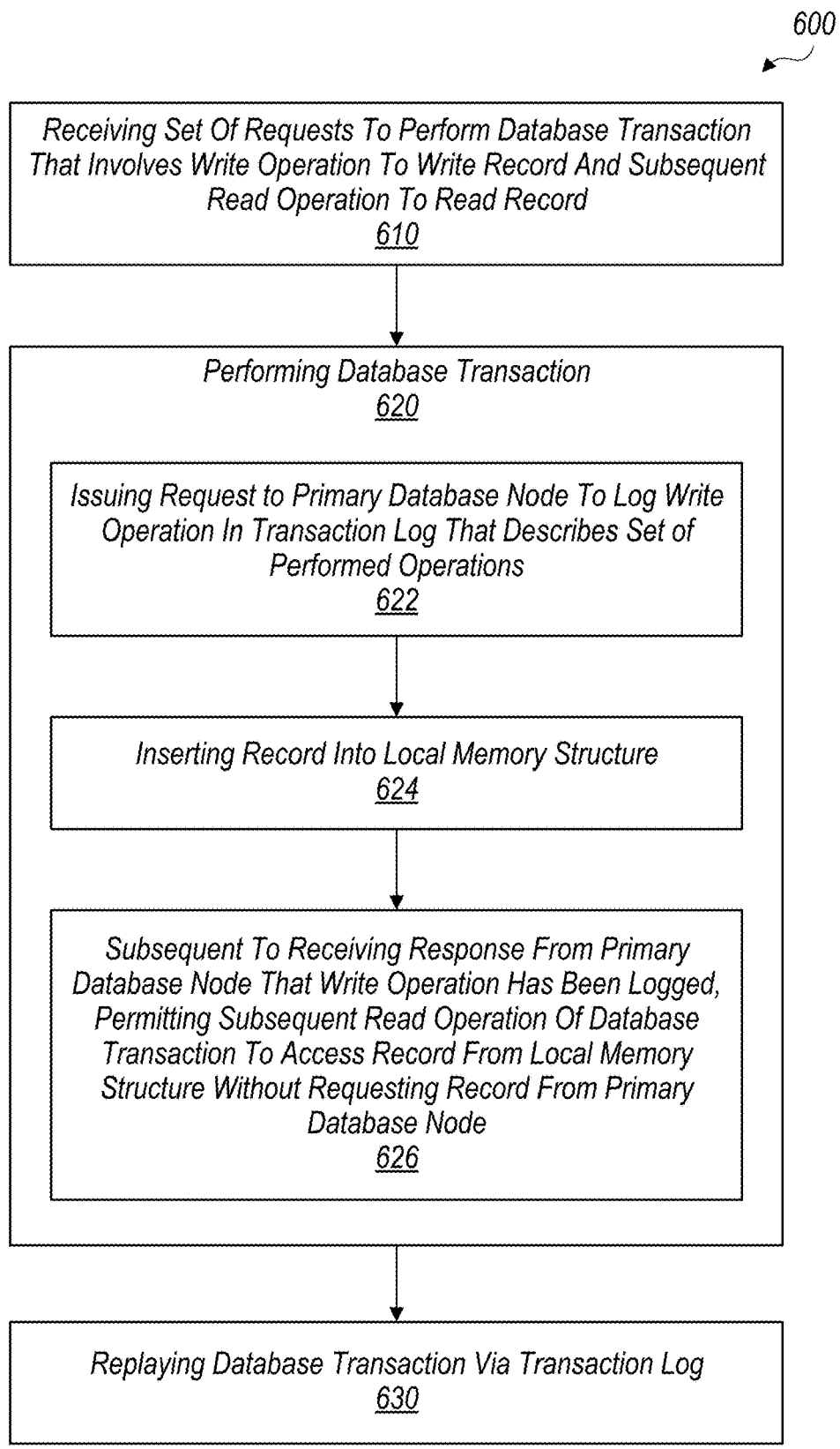

Turning now to FIG. 6, a flow diagram of a method 600 is shown. Method 600 is one embodiment of a method performed by a secondary database node to access records locally without requesting the records from a primary database node. Method 600 may be performed by a computer system executing program instructions stored on a non-transitory computer-readable medium. Method 600 may include more or fewer steps than shown or be performed in a different order.

Method 600 begins in step 610 with the secondary database node receiving a set of requests to perform a database transaction that involves a write operation to write a record and a subsequent read operation to read the record. In step 620, the secondary database node performs the database transaction. As part of performing the database transaction, in step 622, the secondary database node issues a request to the primary database node to log the write operation in a transaction log that describes a set of performed operations.

As part of performing the database transaction, in step 624, the secondary database node inserts the record into a local memory structure of the system. In various embodiments, the secondary database node assigns multiple transaction identifiers to the database transaction. The multiple transaction identifiers may include a reusable transaction identifier and a unique transaction identifier. The unique transaction identifier may identify 1) the secondary database node from a plurality of secondary database nodes and 2) the transaction sequence number that is generated by the secondary database node. In various embodiments, the secondary database node adds the unique transaction identifier to an active list. Step 624 may be performed in response to determining that the unique transaction identifier is still present on the active list. In response to detecting that the database transaction has been aborted, the secondary database node may remove the unique transaction identifier from the active list to prevent subsequent record insertions for the database transaction into the local memory structure.

As part of performing the database transaction, in step 626, subsequent to receiving a response from the primary database node that the write operation has been logged, the secondary database node permits the subsequent read operation of the database transaction to access the record from the local memory structure without requesting the record from the primary database node. The secondary database node may determine whether the local memory structure satisfies a fullness threshold. Based on determining that the local memory structure satisfies the fullness threshold and the replaying of the database transaction has not started, the secondary database node may evict the record from the local memory structure.

In step 630, the secondary database node replays the database transaction via the transaction log. The replaying may include skipping an insertion operation to insert a duplicate of the record into the local memory structure based on a detection that the record is present in the local memory structure. In various embodiments, the secondary database node provides the unique transaction identifier to the primary database node to include in the transaction log to associate the record with the unique transaction identifier. The skipping may be performed based on detecting the unique transaction identifier during the replaying of the transaction log.

Exemplary Computer System

Figure 7:
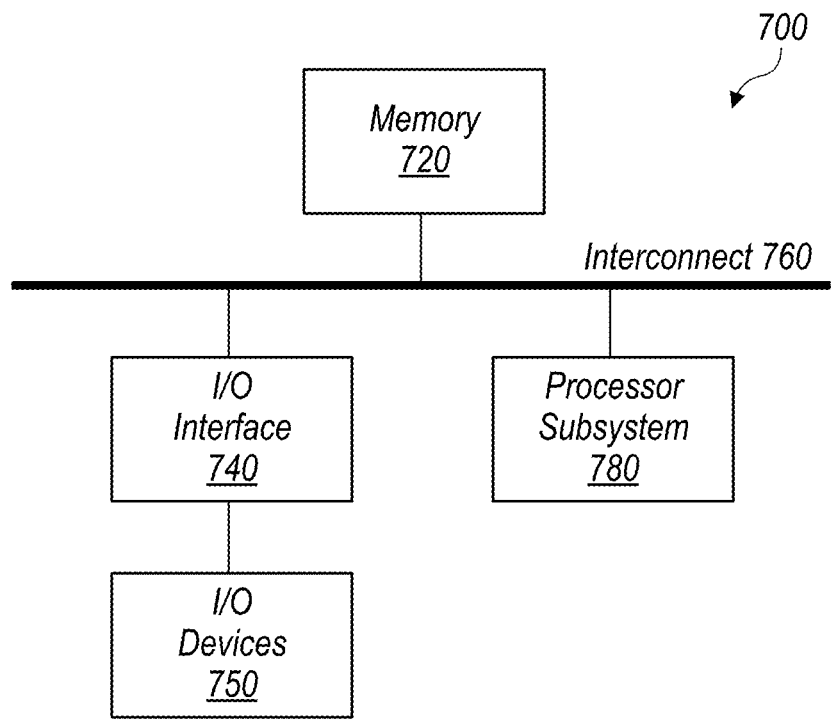
FIG. 7 is a block diagram illustrating elements of a computer system for implementing various systems described in the present disclosure, according to some embodiments.

Turning now to FIG. 7, a block diagram of an exemplary computer system 700, which may implement system 100, database store 110, log owner 140, and/or log tailer 145, is shown. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Although a single computer system 700 is shown for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable store program instructions executable by processor subsystem 780 to cause system 700 perform various operations described herein. System memory 720 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780. In some embodiments, program instructions that when executed implement database store 110, database application 150, and/or memory structure 160 may be included/stored within system memory 720.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over WiFi, Bluetooth, Ethernet, etc.).

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:
  receiving, by a log tailer of a plurality of log tailers of a database system, a set of requests to perform a database transaction that involves a write operation to write a record and a subsequent read operation to read the record, wherein the database system includes 1) a log owner that maintains a transaction log and 2) the plurality of log tailers that replay the transaction log, and wherein the transaction log describes operations performed in the database system; and
  performing, by the log tailer, the database transaction, wherein the performing includes:
    issuing a request to the log owner to log the write operation in the transaction log;
    inserting the record into a local memory structure of the log tailer; and
    subsequent to receiving a response from the log owner that the write operation has been logged, permitting the subsequent read operation of the database transaction to access the record from the local memory structure of the log tailer without requesting the record from the log owner.

2. The method of claim 1, further comprising:
  assigning, by the log tailer, a unique transaction identifier to the database transaction; and
  providing, by the log tailer, the unique transaction identifier to the log owner to include in the transaction log to associate the record with the unique transaction identifier, wherein the unique transaction identifier is usable by the log tailer to prevent a duplicate of the record from being inserted into the local memory structure during a replay of the transaction log.

3. The method of claim 2, further comprising:
  assigning, by the log tailer, a reusable transaction identifier to the database transaction that has a different lifecycle than the unique transaction identifier, wherein the reusable transaction identifier associates a backend process with the database transaction, and wherein the reusable transaction identifier is released after the database transaction is committed from the perspective of the backend process.

4. The method of claim 2, wherein the log owner is operable to include the unique transaction identifier in a log record associated with an initial write operation of the database transaction but exclude the unique transaction identifier from log records associated with subsequent write operations of the database transaction.

5. The method of claim 2, further comprising:
  subsequent to the assigning, the log tailer adding the unique transaction identifier to an active list; and
  before the inserting of the record into the local memory structure, the log tailer determining whether the unique transaction identifier is present on the active list, wherein the inserting is performed based on determining that the unique transaction identifier is still present on the active list.

6. The method of claim 2, wherein the record is inserted with a memory identifier into the local memory structure, wherein the memory identifier has a smaller memory size than the unique transaction identifier, and wherein the method further comprises:
  maintaining, by the log tailer, a mapping between the memory identifier and the unique transaction identifier; and
  determining, by the log tailer during the replay of the database transaction, that the record is present in the local memory structure based on the mapping.

7. The method of claim 2, wherein at least a portion of the unique transaction identifier identifies the log tailer from the plurality of log tailers.

8. The method of claim 1, wherein the inserting of the record into the local memory structure is performed subsequent to the receiving of the response from the log owner.

9. The method of claim 1, further comprising:
  determining, by the log tailer, whether a replay of the database transaction has been initiated within a threshold amount of time after the database transaction has been committed; and
  in response to determining that the replay of the database transaction has not been initiated within the threshold amount of time, the log tailer evicting the record from the local memory structure.

10. The method of claim 1, further comprising:
  determining, by the log tailer, whether the local memory structure satisfies a fullness threshold; and
  in response to determining that the local memory structure satisfies the fullness threshold, the log tailer preventing uncommitted database transactions from inserting records into the local memory structure.

11. A non-transitory computer-readable medium having program instructions stored thereon that are capable of causing a computer system to implement a log tailer that performs operations comprising:
  receiving a set of requests to perform a database transaction that involves a write operation to write a record and a subsequent read operation to read the record;

performing the database transaction, wherein the performing includes:
  issuing a request to a log owner to log the write operation in a transaction log that describes a set of performed operations; and
  subsequent to receiving a response from the log owner that the write operation has been logged:
    inserting the record into a local memory structure of the computer system; and
    permitting the subsequent read operation of the database transaction to access the record from the local memory structure without requesting the record from the log owner; and
  replaying the database transaction via the transaction log, wherein the replaying includes preventing a duplicate of the record from being inserted into the local memory structure.

12. The non-transitory computer-readable medium of claim 11, wherein the operations further comprise:
  assigning a unique transaction identifier to the database transaction; and
  providing the unique transaction identifier to the log owner to include in the transaction log to associate the record with the unique transaction identifier, wherein the preventing of the duplicate from being inserted into the local memory structure is performed based on detecting the unique transaction identifier during the replaying of the transaction log.

13. The non-transitory computer-readable medium of claim 12, wherein the operations further comprise:
  adding the unique transaction identifier to an active list, wherein the inserting is performed in response to determining that the unique transaction identifier is still present on the active list; and
  in response to detecting that the database transaction has been aborted, removing the unique transaction identifier from the active list to prevent subsequent record insertions for the database transaction into the local memory structure.

14. The non-transitory computer-readable medium of claim 12, wherein the operations further comprise:
  generating a transaction sequence number, wherein the unique transaction identifier identifies 1) the log tailer from a plurality of log tailers and 2) the transaction sequence number.

15. The non-transitory computer-readable medium of claim 11, wherein the operations further comprise:
  determining whether the local memory structure satisfies a fullness threshold; and
  based on determining that the local memory structure satisfies the fullness threshold and the database transaction has not been replayed via the transaction log, evicting the record from the local memory structure.

16. A system, comprising:
  at least one processor; and
  memory having program instructions stored thereon that are executable by the at least one processor to cause the system to implement a secondary database node that performs operations comprising:
    receiving a set of requests to perform a database transaction that involves a write operation to write a record and a subsequent read operation to read the record;
    performing the database transaction, wherein the performing includes:
      issuing a request to a primary database node to log the write operation in a transaction log that describes a set of performed operations;
      inserting the record into a local memory structure of the system; and
      subsequent to receiving a response from the primary database node that the write operation has been logged, permitting the subsequent read operation of the database transaction to access the record from the local memory structure without requesting the record from the primary database node; and
    replaying the database transaction via the transaction log, wherein the replaying includes skipping an insertion operation to insert a duplicate of the record into the local memory structure based on a detection that the record is present in the local memory structure.

17. The system of claim 16, wherein the operations further comprise:
  assigning multiple transaction identifiers to the database transaction, wherein the multiple transaction identifiers include a reusable transaction identifier and a unique transaction identifier; and
  providing the unique transaction identifier to the primary database node to include in the transaction log to associate the record with the unique transaction identifier, wherein the skipping is performed based on detecting the unique transaction identifier during the replaying of the transaction log.

18. The system of claim 17, wherein the operations further comprise:
  adding the unique transaction identifier to an active list, wherein the inserting is performed in response to determining that the unique transaction identifier is still present on the active list; and
  in response to detecting that the database transaction has been aborted, removing the unique transaction identifier from the active list to prevent subsequent record insertions for the database transaction into the local memory structure.

19. The system of claim 17, wherein the operations further comprise:
  generating a transaction sequence number, wherein the unique transaction identifier identifies 1) the secondary database node from a plurality of secondary database nodes and 2) the transaction sequence number.

20. The system of claim 16, wherein the operations further comprise:
  determining whether the local memory structure satisfies a fullness threshold; and
  based on determining that the local memory structure satisfies the fullness threshold and the replaying of the database transaction has not started, evicting the record from the local memory structure.

* * * * *